(12) United States Patent
Tsukamoto et al.

(10) Patent No.: US 11,750,053 B2
(45) Date of Patent: Sep. 5, 2023

(54) STATOR, MOTOR, COMPRESSOR, AND AIR CONDITIONER

(71) Applicant: Mitsubishi Electric Corporation, Tokyo (JP)

(72) Inventors: Emi Tsukamoto, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 336 days.

(21) Appl. No.: 16/965,462

(22) PCT Filed: Feb. 21, 2018

(86) PCT No.: PCT/JP2018/006204
§ 371 (c)(1),
(2) Date: Jul. 28, 2020

(87) PCT Pub. No.: WO2019/163021
PCT Pub. Date: Aug. 29, 2019

(65) Prior Publication Data
US 2020/0358327 A1    Nov. 12, 2020

(51) Int. Cl.
*H02K 3/02* (2006.01)
*H02K 3/12* (2006.01)

(52) U.S. Cl.
CPC ............... *H02K 3/02* (2013.01); *H02K 3/12* (2013.01)

(58) Field of Classification Search
CPC .. H02K 3/00; H02K 3/02; H02K 3/12; H02K 17/165; H02K 2213/03
See application file for complete search history.

(56) References Cited

U.S. PATENT DOCUMENTS

2013/0186130 A1*  7/2013  Tsutsumi ............ F04C 23/008
                                                62/498
2016/0105061 A1*  4/2016  Horisaka .................. H02K 3/02
                                                310/195
(Continued)

FOREIGN PATENT DOCUMENTS

CN        105229899 A        1/2016
CN        102080655       * 10/2020
(Continued)

OTHER PUBLICATIONS

CN102080655_translate (Year: 2020).*
Engineering Tool Box, (2014). Aluminum and Copper Wires—Electrical Resistance vs. Cross-Sectional Area. [online] Available at: https://www.engineeringtoolbox.com/copper-aluminum-conductor-resistance-d_1877.html [Dec. 20, 2022], (Year: 2014).*
International Search Report of the International Searching Authority dated May 22, 2018 for the corresponding International application No. PCT/JP2018/006204(and English translation).
(Continued)

*Primary Examiner* — Tulsidas C Patel
*Assistant Examiner* — Mohammed Ahmed Qureshi
(74) *Attorney, Agent, or Firm* — POSZ LAW GROUP, PLC

(57) ABSTRACT

A first coil including a first metal, and a second coil including a second metal having a lower electrical resistivity than the first metal are disposed in a slot of a stator core. The slot includes a slot opening, a curved slot bottom portion connecting to a yoke, and first and second side portions disposed between the slot opening and the slot bottom portion. A first straight line connects borders between the slot bottom portion and either of the side portions. A first region is surrounded by the first straight line and the slot bottom portion. A second region is located between the slot opening and the first straight line in the radial direction. Areas S1 and S2 of the first and second regions, and total cross-sectional areas A1 and A2 of the first coil in the first and second regions satisfy (A1/S1)>(A2/S2).

15 Claims, 12 Drawing Sheets

(56) References Cited

U.S. PATENT DOCUMENTS

| | | | |
|---|---|---|---|
| 2017/0045268 A1 | 2/2017 | Fujisue | |
| 2018/0083496 A1* | 3/2018 | Honjo | H02K 1/04 |
| 2019/0207460 A1* | 7/2019 | Iwaki | H02K 15/0018 |
| 2020/0350804 A1* | 11/2020 | Ono | H02K 7/14 |

FOREIGN PATENT DOCUMENTS

| | | |
|---|---|---|
| EP | 2 207 254 A2 | 7/2010 |
| JP | H10-174330 A | 6/1998 |
| JP | 2010-166643 A | 7/2010 |
| JP | 2010-183741 A | 8/2010 |
| WO | 2014/188466 A1 | 11/2014 |
| WO | 2015/166726 A1 | 11/2015 |

OTHER PUBLICATIONS

Office Action dated Jan. 4, 2022 in connection with counterpart Japanese Patent Application No. 2020-501898 as well as a machine English translation.

Indian Office Action dated Mar. 18, 2021, issued in corresponding Indian Patent Application No. 202027033494 (and English Machine Translation).

Office Action dated Jun. 29, 2021, issued in corresponding JP Patent Application No. 2020-501898 (and English machine translation).

Notice of Reasons for Refusal dated Mar. 8, 2022 in corresponding CN Patent Application No. 201880089216.6 (with machine English translation).

\* cited by examiner

FIG. 9

| | WIRE CROSS-SECTIONAL AREA OF COIL [mm²] | CROSS-SECTIONAL AREA RATIO | RESISTANCE OF CONDUCTOR [Ω/km] | CURRENT [A] | LOSS [W] | LOSS DENSITY [W/mm²] | LOSS DENSITY RATIO |
|---|---|---|---|---|---|---|---|
| COPPER WIRE | $S_{Cu}$ | 1 | $R_{Cu}$ | 1 | $R_{Cu}$ | $R_{Cu}/S_{Cu}$ | 1 |
| ALUMINUM WIRE | $kS_{Cu}$ | k | $R_{Al}$ | 1 | $R_{Al}$ | $R_{Al}/kS_{Cu}$ | $R_{Al}/kR_{Cu}$ |

STATOR, MOTOR, COMPRESSOR, AND AIR CONDITIONER

CROSS REFERENCE TO RELATED APPLICATION

This application is a U.S. national stage application of International Patent Application No. PCT/JP2018/006204 filed on Feb. 21, 2018, the disclosure of which is incorporated herein by reference.

TECHNICAL FIELD

The present invention relates to a stator, a motor, a compressor, and an air conditioner.

BACKGROUND

In the technical field of motors, an increase in output and reduction in size of motors are recently demanded. When the output of the motor is increased, a current flowing through a coil increases. Furthermore, when the size of the motor is reduced, the current required to obtain the same output increases. Thus, dissipation of heat generated in the coil is an issue to be solved.

In a motor used in a compressor, a coil of a stator is hardly in contact with refrigerant and lubricating oil inside the compressor. Thus, heat generated in the coil needs to be dissipated from the stator core. Heat generation in the coil is due to an electrical resistance of the coil, and thus it is desirable that the electrical resistance of the coil is low in order to suppress the heat generation in the coil.

The use of an aluminum wire coil in combination with a conventional copper wire coil is recently proposed in order to reduce the cost and weight of a motor (see, for example, Patent Reference 1).

PATENT REFERENCE

Patent Reference 1

International Publication WO2014/188466 (see FIG. 3)

However, the aluminum wire coil has a higher electrical resistivity than the copper wire coil, and therefore a large amount of heat is generated when a current flows through the aluminum wire coil. Thus, it is demanded to enhance the heat dissipation effect while using different types of coils.

SUMMARY

The present invention is intended to solve the above-described problems, and an object of the present invention is to enhance the heat dissipation effect while using different types of coils.

A stator of the present invention includes a stator core having an inner circumference extending in a circumferential direction about an axis, and a slot formed on an outer side of the inner circumference in a radial direction about the axis, and a first coil and a second coil disposed in the slot and connected in series with each other. The first coil has a conductor formed of a first metal. The second coil has a conductor formed of a second metal that has a lower electrical resistivity than that of the first metal. The slot includes a slot opening opened to the inner circumference of the stator core, a slot bottom portion having a curved shape and disposed on an outer side of the slot opening in the radial direction, and a first side portion and a second side portion disposed between the slot opening and the slot bottom portion and facing each other in the circumferential direction. In a plane perpendicular to the axis, a first straight line is defined as a straight line connecting a border between the slot bottom portion and the first side portion and a border between the slot bottom portion and the second side portion. A first region is defined as a region surrounded by the first straight line and the slot bottom portion. A second region is defined as a region in the slot on an outer side of the slot opening in the radial direction and on an inner side of the first straight line in the radial direction. An area S1 of the first region, a total cross-sectional area A1 of the first coil in the first region, an area S2 of the second region, and a total cross-sectional area A2 of the first coil in the second region satisfy $(A1/S1)>(A2/S2)$.

According to the present invention, of the first and second coils, the first coil which has the higher electrical resistivity is densely disposed in the first region which is closer to the outer circumference of the stator core than the second region. Thus, the heat generated in the first coil can be efficiently transferred to the stator core. Thus, the heat generated in the first coil can be efficiently dissipated, and an increase in the temperature of the first and second coils can be suppressed.

BRIEF DESCRIPTION OF THE DRAWINGS

FIG. 9 is a table showing characteristics of the aluminum wire coil and the copper wire coil of the first embodiment.

FIRST EMBODIMENT

Figure 1:
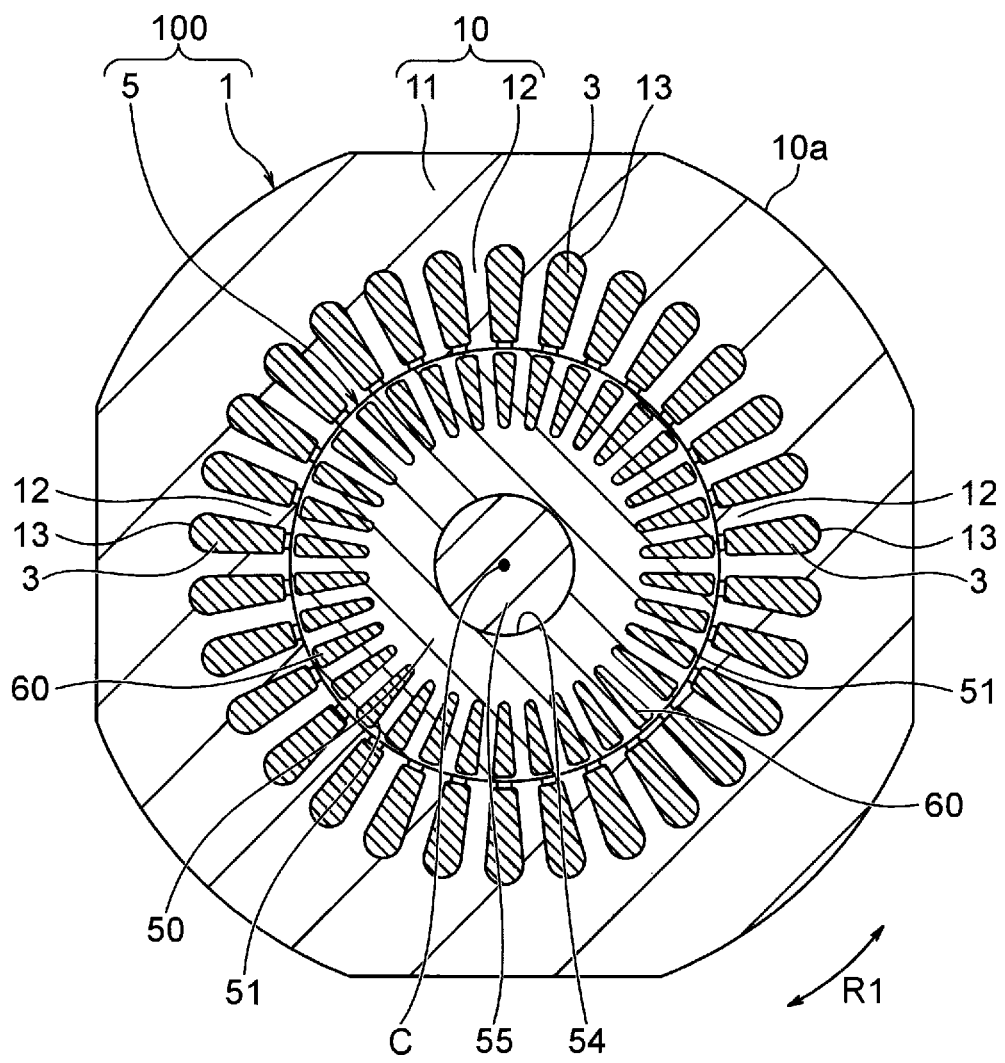
FIG. 1 is a cross-sectional view showing a motor of a first embodiment.

FIG. 1 is a cross-sectional view showing a motor 100 of a first embodiment. The motor 100 shown in FIG. 1 is an induction motor and is used, for example, in a compressor of an air conditioner. The motor 100 includes a stator 1 and a rotor 5 rotatably provided on an inner side of the stator 1. An air gap is provided between the stator 1 and the rotor 5.

Hereinafter, a direction of an axis C, which is a center of rotation of the rotor 5, is referred to as an "axial direction". A circumferential direction (indicated by an arrow R1 in FIG. 1 and the like) about the axis C is referred to as a "circumferential direction". A radial direction about the axis C is referred to as a "radial direction".

(Configuration of Rotor 5)

Figure 2A:
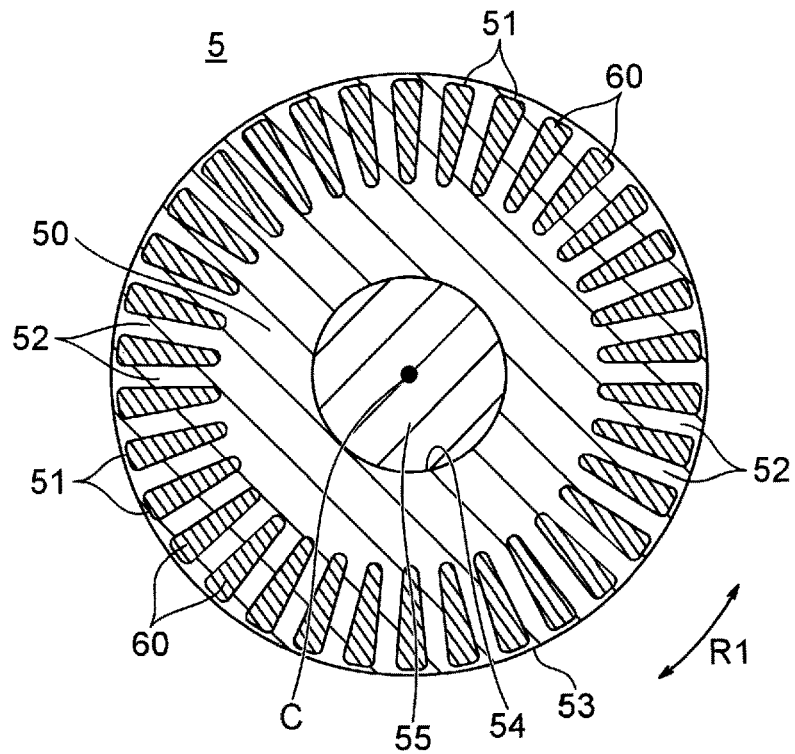
FIGS. 2(A) and 2(B) are a cross-sectional view and a perspective view showing a rotor of the first embodiment, respectively.
Figure 2B:
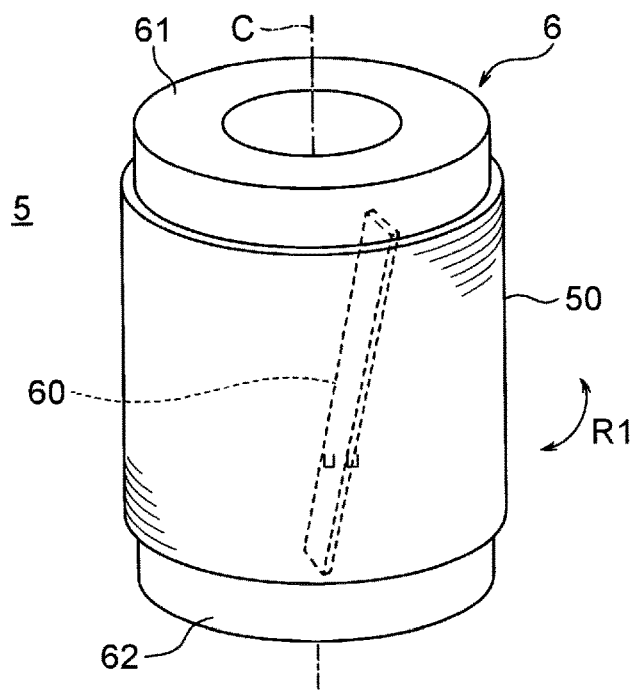

FIGS. 2(A) and 2(B) are a cross-sectional view and a perspective view showing the rotor 5. As shown in FIG. 2(A), the rotor 5 includes a rotor core 50 having a plurality of slots 51, a shaft 55 which serves as a rotation shaft, and bars 60 inserted into the slots 51 of the rotor core 50.

The rotor core 50 is obtained by stacking electromagnetic steel sheets each having a thickness of, for example, 0.1 to 0.7 mm in the axial direction and integrating the sheets together by crimping or the like. A circular shaft hole 54 is formed at a center of the rotor core 50 in the radial direction. The shaft 55 is fixed to the shaft hole 54 by press-fitting. A center axis of the shaft 55 is the axis C serving as the center of the rotation of the rotor 5.

The rotor core 50 is formed in an annular shape about the axis C. The plurality of slots 51 (also referred to as rotor slots) are formed at equal intervals in the circumferential direction along an outer circumference 53 of the rotor core 50. The number of slots 51 is 34 in this example, but is not limited to 34. Each slot 51 is a groove extending in the radial direction, and passes through the rotor core 50 in the axial direction. Teeth 52 (also referred to as rotor teeth) are each formed between two of the slots 51 adjacent to each other in the circumferential direction.

As shown in FIG. 2(B), the rotor 5 includes a pair of end rings 61 and 62 on both ends of the rotor core 50 in the axial direction. The end rings 61 and 62 are connected to both ends of the bars 60 in the axial direction and integrally formed with the bars 60. The bars 60 and the end rings 61 and 62 constitute a squirrel-cage secondary conductor 6.

The squirrel-cage secondary conductor 60 is formed of a non-magnetic material with electrical conductivity such as, for example, aluminum. The end rings 61 and 62 and the bars 60 of the squirrel-cage secondary conductor 6 are formed by casting aluminum at both ends of the rotor core 50 and in the slots 51. Copper may be used in place of aluminum.

The bar 60 extends to be inclined so that one end of the bar in the longitudinal direction is displaced in the circumferential direction with respect to the other end of the bar 60. In FIG. 2(B), only one bar 60 is shown by a dashed line. When magnetic flux of the stator 1 interlinks with the bars 60 of the rotor 5, a secondary current is generated in the bars 60. The secondary current and the magnetic flux of the stator 1 generates a torque that rotates the rotor 5.

(Configuration of Stator 1)

Figure 3:
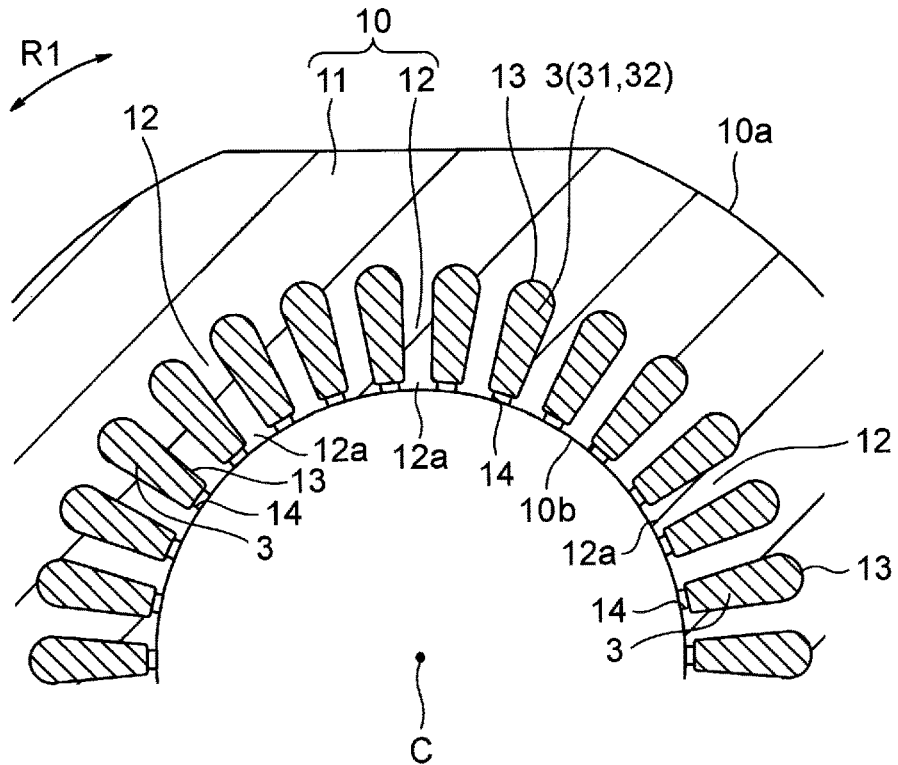
FIG. 3 is an enlarged cross-sectional view showing a part of a stator of the first embodiment.

FIG. 3 is an enlarged cross-sectional view showing a part of the stator 1. The stator 1 includes a stator core 10 and a coil 3 wound on the stator core 10. The coil 3 includes an aluminum wire coil 31 as a first coil and a copper wire coil 32 as a second coil. The aluminum wire coil 31 and the copper wire coil 32 will be described later.

The stator core 10 is obtained by stacking electromagnetic steel sheets each having a thickness of, for example, 0.1 to 0.7 mm in the axial direction, and integrating the sheets together by crimping or the like. The stator core 10 has an inner circumference 10b extending in the circumferential direction about the axis C and an outer circumference 10a disposed on an outer side of the inner circumference 10b in the radial direction. In the stator core 10, the plurality of slots 13 opened to the inner circumference 10b are formed at equal intervals in the circumferential direction. The coil 3 is accommodated in the slot 13. The number of slots 13 is 30 in this example, but is not limited to 30.

The stator core 10 includes an annular yoke (also referred to as a core back) 11 and a plurality of teeth 12 protruding inward in the radial direction from the yoke 11. The teeth 12 are arranged at equal intervals in the circumferential direction. The above-described slot 13 is formed between two teeth 12 adjacent to each other in the circumferential direction. The number of teeth 12 is the same as the number of slots 13 (in this example, 30). The coil 3 is wound around the tooth 12.

The tooth 12 has a tooth tip portion 12a at its tip end on the inner side in the radial direction. The tooth tip portion 12a has a width (i.e., a dimension in the circumferential direction) wider than the width of other portions of the tooth 12. An end of the tooth tip portion 12a has an arc shape and forms the above-described inner circumference 10b of the stator core 10.

Figure 4:
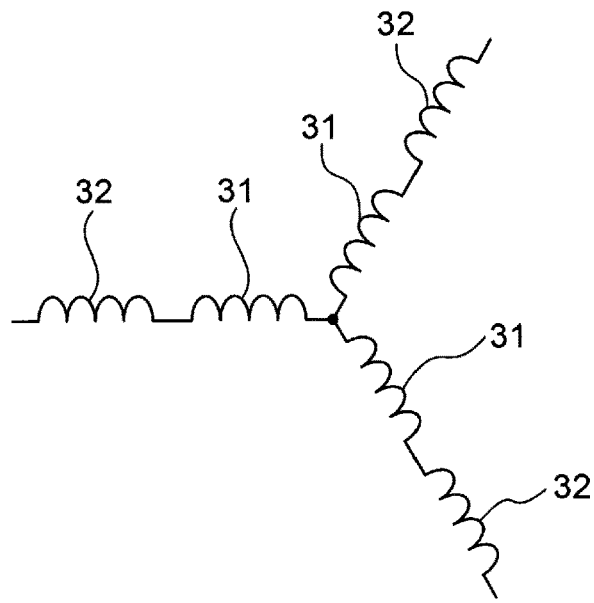
FIG. 4 is a schematic diagram showing a connection state between an aluminum wire coil and a copper wire coil of the first embodiment.

FIG. 4 is a diagram showing a connection state between the aluminum wire coil 31 and the copper wire coil 32 of the coil 3. The aluminum wire coil 31 and the copper wire coil 32 of the coil 3 are connected in series with each other. The coil 3 has three-phase (U-phase, V-phase, and W-phase) coil portions, and the coil portions are connected in Y-connection.

Figure 5:
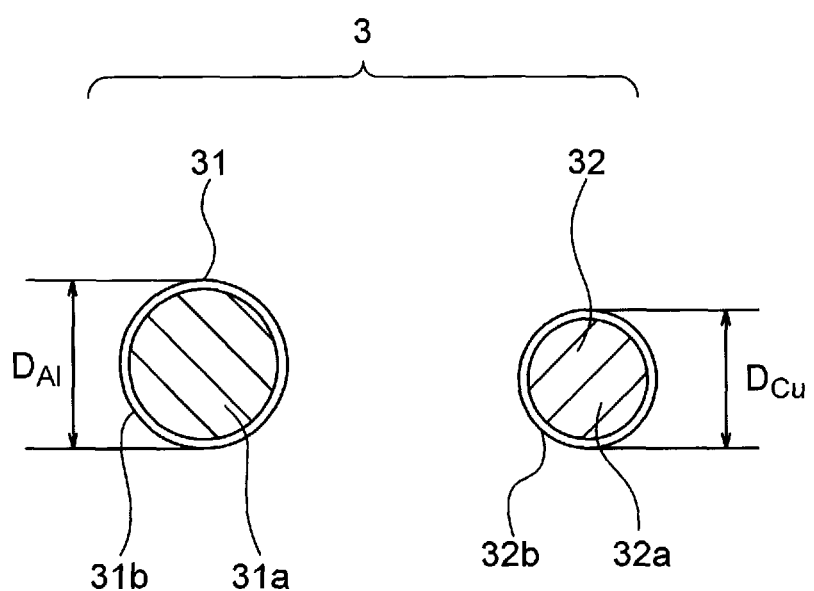
FIG. 5 is a schematic diagram showing cross-sectional structures of the aluminum wire coil and the copper wire coil of the first embodiment.

FIG. 5 is a schematic diagram showing cross-sectional structures of the aluminum wire coil 31 and the copper wire coil 32. The aluminum wire coil 31 has a conductor 31a formed of aluminum as a first metal, and a circumference of the conductor 31a is covered with an insulating resin film 31b. The first metal forming the conductor 31a is aluminum in this example, but is not limited to aluminum.

An electrical resistance of the conductor 31a of the aluminum wire coil 31 is expressed as $R_{Al}$, and an electrical resistivity of the conductor 31a is expressed as $\rho_{Al}$. A diameter (also referred to as a wire diameter) of the aluminum wire coil 31 is expressed as $D_{Al}$. A thickness of the film 31b is thinner as compared with the diameter of the conductor 31a, and thus the diameter $D_{Al}$ can be considered to be equivalent to the diameter of the conductor 31a.

The second coil 32 has a conductor 32a formed of copper as a second metal that has a lower electrical resistivity than that of the first metal. A circumference of the conductor 32a is covered with an insulating coating 32b. The second metal forming the conductor 32a is copper in this example, but is not limited to copper.

An electrical resistance of the conductor 32a of the copper wire coil 32 is expressed as $R_{Cu}$, and an electrical resistivity thereof is expressed as $\rho_{Cu}$. A diameter of the copper wire coil 32 is expressed as $D_{Cu}$. Since a thickness of the coating 32b is thinner as compared with the diameter of the conductor 32a, the diameter $D_{Cu}$ can be considered to be equivalent to the diameter of the conductor 32a.

Figure 6:
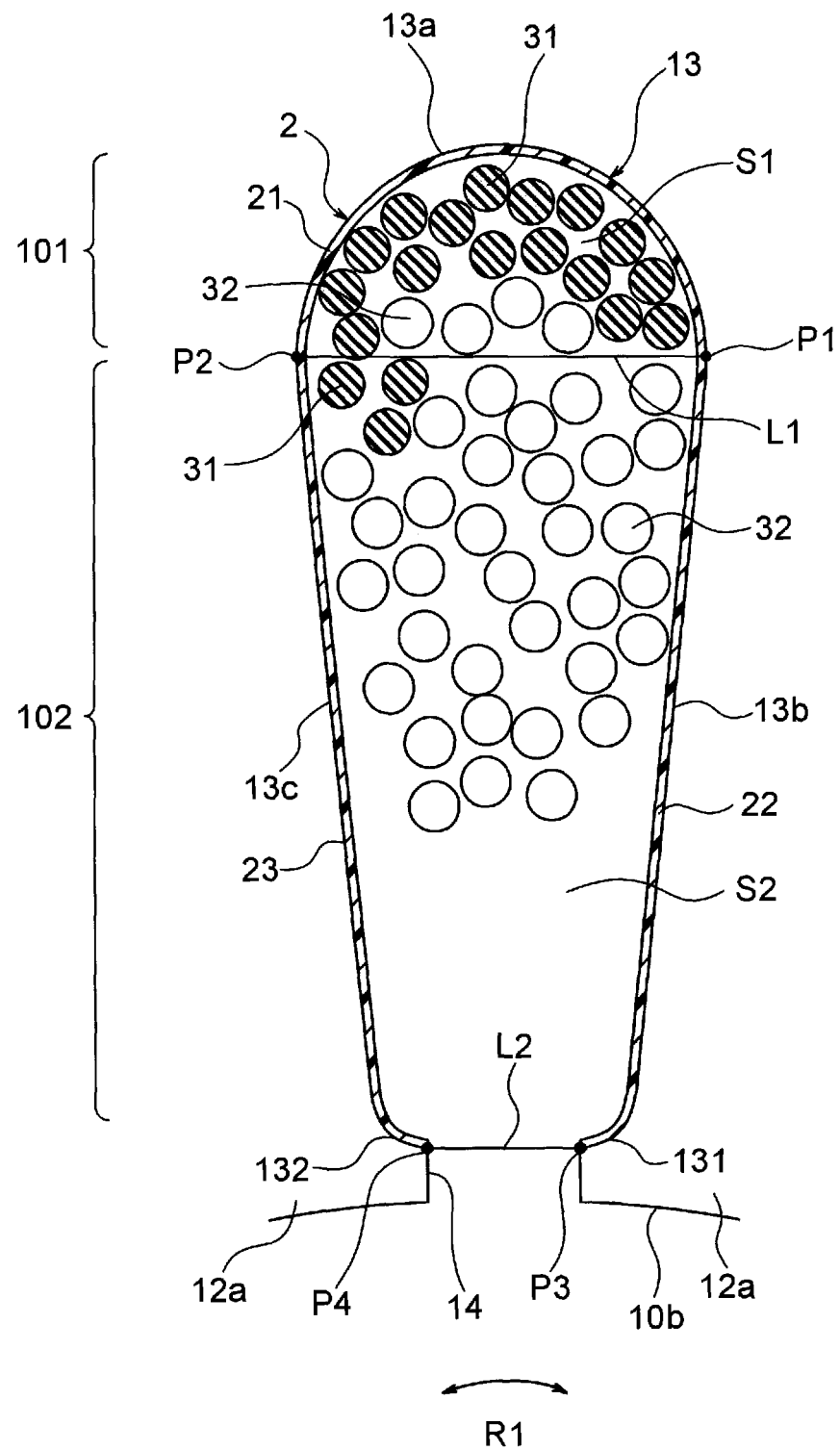
FIG. 6 is an enlarged cross-sectional view showing a part of the stator of the first embodiment.

FIG. 6 is an enlarged diagram showing a part of the stator 1 that includes the slot 13. The slot 13 has a slot opening 14 leading to the inner circumference 10b of the stator core 10 and a slot bottom portion 13a having a curved shape and disposed on an outer side of the slot opening 14 in the radial direction. Further, the slot 13 has a first side portion 13b and a second side portion 13c which are disposed between the slot opening 14 and the slot bottom portion 13a in the radial direction. The first side portion 13b and the second side portion 13c face each other in the circumferential direction.

The slot opening 14 is formed between tooth tip portions 12a adjacent to each other in the circumferential direction. The slot opening 14 serves as an inlet through which the coil 3 passes when the coil 3 is wound around the tooth 12, i.e., when the coil 3 is disposed in the slot 13.

The slot bottom portion 13a has a curved shape (more specifically, an arc shape) such that a center of the slot bottom portion 13a in the circumferential direction protrudes outward in the radial direction with respect to both ends of the slot bottom portion 13a in the circumferential direction. The length of the slot bottom portion 13a in the circumferential direction is longer than the length of the slot opening 14 in the circumferential direction.

The side portions 13b and 13c extend from the slot opening 14 toward the slot bottom portion 13a. The side portions 13b and 13c extend such that an interval between these side portions in the circumferential direction increases outward in the radial direction.

The first side portion 13b has a curved portion 131 at a part leading to the slot opening 14. The curved portion 131 is curved so that a part thereof located closer to the slot opening 14 is displaced inward in the circumferential direction in the slot 13. The second side portion 13c has a curved portion 132 at a part leading to the slot opening 14. The curved portion 132 is curved so that a part thereof located closer to the slot opening 14 is displaced inward in the circumferential direction in the slot 13.

An insulating portion 2 is provided on an inner surface of each slot 13. The insulating portion 2 is formed of, for example, a resin such as polyethylene terephthalate (PET). The insulating portion 2 electrically insulates the coil 3 in the slot 13 from the stator core 10. The insulating portion 2 includes a first part 21 covering the slot bottom portion 13a, a second part 22 covering the first side portion 13b, and a third part 23 covering the second side portion 13c.

An interior of the slot 13 may be filled with a resin having a high thermal conductivity so that the resin surrounds the coil 3 (i.e., the aluminum wire coil 31 and the copper wire coil 32). For example, polybutylene terephthalate (PBT) or the like can be used as the resin.

In this example, the interior of the slot 13 is divided into a first region 101 and a second region 102. This will be described below.

In a plane perpendicular to the axis C, a first point P1 is defined as a border between the slot bottom portion 13a of the slot 13 and the first side portion 13b. A second point P2 is defined as a border between the slot bottom portion 13a of the slot 13 and the second side portion 13c. These points P1 and P2 correspond to both ends of the slot bottom portion 13a of the slot 13 in the circumferential direction. A first straight line L1 is defined as a straight line connecting the first point P1 and the second point P2. The first region 101 is defined as a region surrounded by the first straight line L1 and the slot bottom portion 13a.

In the plane perpendicular to the axis C, a third point P3 is defined as a point disposed at an outer end of the slot opening 14 in the radial direction and on the first side portion 13b side. A fourth point P4 is defined as a point disposed at the outer end of the slot opening 14 in the radial direction and on the second side portion 13c side. A second straight line L2 is defined as a straight line connecting the third point P3 and the fourth point P4. The second region 102 is defined as a region surrounded by the second straight line L2 and the first straight line L1. In other words, the second region 102 is the region on the outer side of the slot opening 14 in the radial direction and on the inner side of the first straight line L1 in the radial direction in the slot 13.

Since the insulating portion 2 is provided on the inner side of the slot 13, the points P1 to P4 may be defined on an inner surface of the insulating portion 2. That is, the first point P1 may be defined as a border between an inner surface of the first part 21 and an inner surface of the second part 22 of the insulating portion 2, while the second point P2 may be defined as a border between the inner surface of the first part 21 and an inner surface of the third part 23 of the insulating portion 2. The point P3 may be defined as a point closest to the slot opening 14 on the inner surface of the second part 22 of the insulating portion 2. The point P4 may be defined as a point closest to the slot opening 14 on the inner surface of the third part 23 of the insulating portion 2.

An area of the first region 101 is expressed as S1, while an area of the second region 102 is expressed as S2. A total cross-sectional area of the aluminum wire coil 31 disposed in the first region 101 is expressed as A1, while a total cross-sectional area of the aluminum wire coil 31 disposed in the second region 102 is expressed as A2. A total cross-sectional area of the copper wire coil 32 disposed in the first region 101 is expressed as C1, while a total cross-sectional area of the copper wire coil 32 disposed in the second region 102 is expressed as C2.

In this regard, the "total cross-sectional area of the coil" means a sum of cross-sectional areas of coil elements disposed in a given region. In other words, the "total cross-sectional area of the coil" means a product of a cross-sectional area of each coil element of the coil and the number of the coil elements disposed in the given region.

The area S1 of the first region 101, the total cross-sectional area A1 of the aluminum wire coil 31 in the first region 101, the area S2 of the second region 102, and the total cross-sectional area A2 of the aluminum wire coil 31 in the second region 102 satisfy (A1/S1)>(A2/S2).

That is, the aluminum wire coil 31 is arranged so that an occupancy density thereof in the first region 101 is higher than an occupancy density thereof in the second region 102. In other words, the aluminum wire coil 31 is disposed more densely in the first region 101 than in the second region 102.

The area S1 of the first region 101, the total cross-sectional area A1 of the aluminum wire coil 31 in the first region 101, and the total cross-sectional area C1 of the copper wire coil 32 in the first region 101 satisfy (A1/S1)>(C1/S1).

That is, in the first region 101, the occupancy density of the aluminum wire coil 31 is higher than the occupancy density of the copper wire coil 32. In other words, in the first region 101, the aluminum wire coil 31 is disposed more densely than the copper wire coil 32.

The total cross-sectional area A1 of the aluminum wire coil 31 and the total cross-sectional area C1 of the copper wire coil 32 in the first region, and the total cross-sectional area A2 of the aluminum wire coil 31 and the total cross-sectional area C2 of the copper wire coil 32 in the second region 102 satisfy (A1/C1)>(A2/C2). That is, a ratio of the total cross-sectional area of the aluminum wire coil 31 to the total cross-sectional area of the copper wire coil 32 is higher in the first region 101 than in the second region 102.

(Function)

Next, a function of the motor in the first embodiment will be described. When the output of the motor 100 increases, a current flowing through the coil 3 increases, and thus the amount of heat generated in the coil 3 increases. An area where the coil 3 disposed in the slot 13 is in contact with the refrigerant, the lubricating oil, and the air is small, and thus heat of the coil 3 is dissipated through the stator core 10. In order to suppress an increase in the temperature of the coil 3, it is necessary to effectively dissipate the heat of the coil 3 through the stator core 10.

Figure 7:
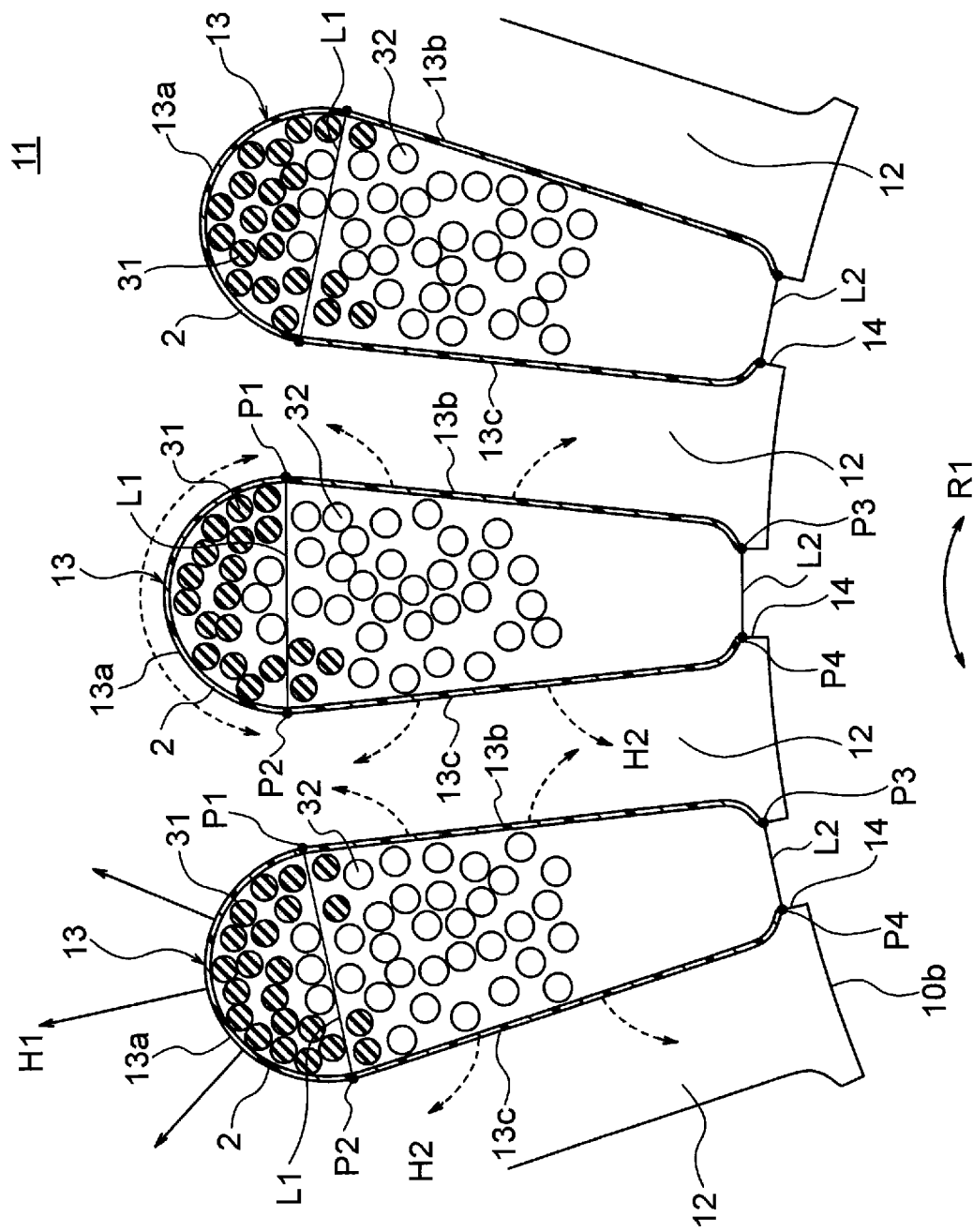
FIG. 7 is a schematic diagram showing a heat dissipation function from slots of the stator of the first embodiment.

FIG. 7 is a schematic diagram showing a heat dissipation function from the slots 13 in the stator 1. As shown in FIG. 7, the heat generated in the coil 3 in the slot 13 of the stator 1 is dissipated through a heat dissipation path from the slot 13 toward the yoke 11 on the outer side of the slot 13 in the radial direction as indicated by the arrow H1, or through heat dissipation paths from the slot 13 toward the teeth 12 on both sides of the slot 13 in the circumferential direction as indicated by the arrow H2.

Among the heat dissipation paths, the tooth 12 has a small area, and heat is transferred to one tooth 12 from the slots 13 on both sides of the tooth 12. Thus, the heat tends to be accumulated in the tooth 12. In contrast, the yoke 11 has a large area and its outer circumference 10a (FIG. 1) is in contact with a closed container (to be described later) of the compressor or the like, so that the heat is easily dissipated to the outside of the stator 1. That is, in the slot 13, the heat dissipation efficiency is higher in the first region 101 adjacent to the yoke 11 than in the second region 102 adjacent to the tooth 12.

The electrical resistivity of the aluminum wire coil 31 is higher than that of the copper wire coil 32, and thus the amount of heat generated in the aluminum wire coil 31 is larger than the amount of heat generated in the copper wire coil 32. Further, the thermal conductivity of the aluminum wire coil 31 is lower than that of the copper wire coil 32, and therefore the temperature of the aluminum wire coil 31 is easily raised.

Thus, in the first embodiment, the aluminum wire coil 31 is disposed more densely in the first region 101 than in the second region 102. That is, (A1/S1)>(A2/S2) is satisfied. The aluminum wire coil 31, whose temperature is easily raised, is disposed more densely in the first region 101 than in the second region 102, and therefore the heat of the aluminum wire coil 31 can be efficiently dissipated through the yoke 11.

In addition, since the contact area between coil elements of the aluminum wire coil 31 and the contact area between the aluminum wire coil 31 and the copper wire coil 32 increase, and the distance between the aluminum wire coil 31 and the stator core 10 is shortened, the heat of the aluminum wire coil 31 is easily transferred to the stator core 10. Thus, an increase in the temperature of the aluminum wire coil 31 can be suppressed.

In the first region 101, the occupancy density of the aluminum wire coil 31 is higher than the occupancy density of the copper wire coil 32. That is, (A1/S1)>(C1/S1) is satisfied. In the first region 101, the aluminum wire coil 31 is disposed more densely than the copper wire coil 32, and thus the heat of the aluminum wire coil 31 can be easily dissipated through the yoke 11. Thus, the heat dissipation effect can be further enhanced.

The ratio of the total cross-sectional area of the aluminum wire coil 31 to the total cross-sectional area of the copper wire coil 32 is higher in the first region 101 than in the second region 102. That is, (A1/C1)>(A2/C2) is satisfied. Since the ratio of the total cross-sectional area of the aluminum wire coil 31 to that of the copper wire coil 32 is higher in the first region 101, the heat of the aluminum wire coil 31 can be easily dissipated through the yoke 11. Thus, the heat dissipation effect can be further enhanced.

Figure 8:
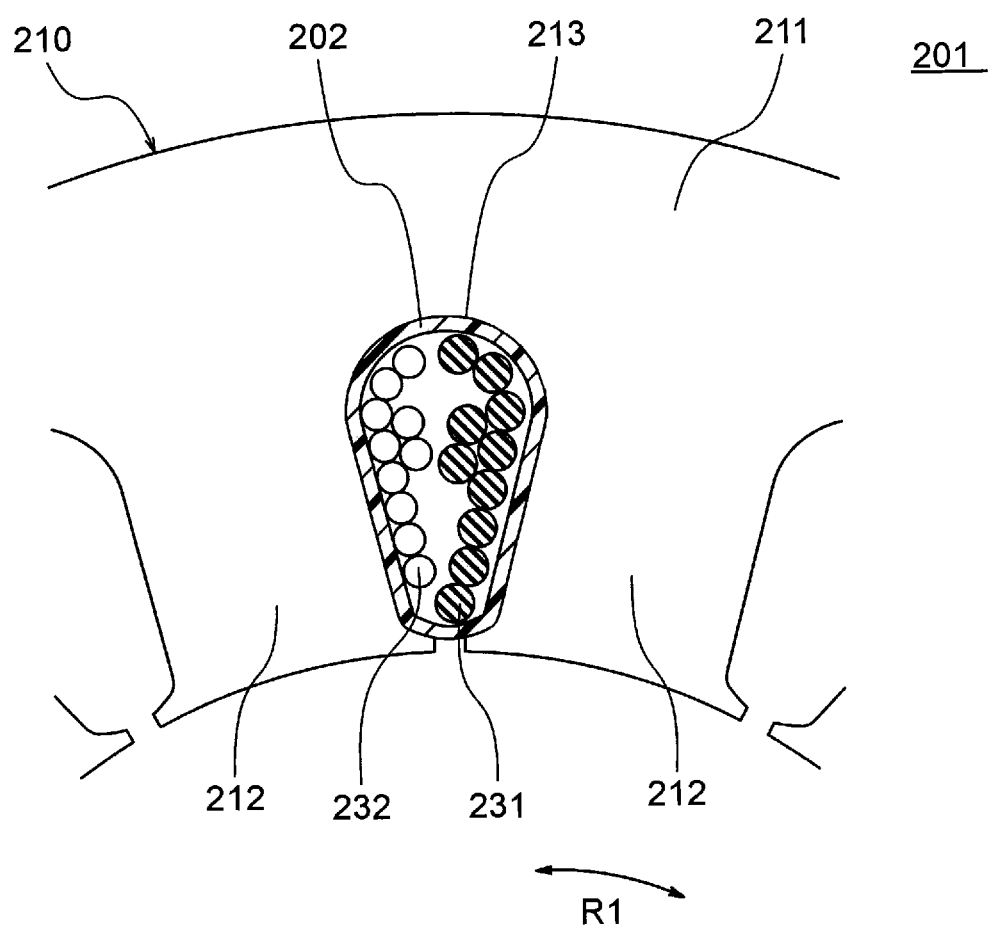
FIG. 8 is an enlarged cross-sectional view showing a part of a stator of a comparison example.

FIG. 8 is an enlarged diagram showing a part of a stator 201 of a comparison example. A stator core 210 of the stator 201 of the comparison example includes an annular yoke 211 and a plurality of teeth 212 extending inward in the radial direction from the yoke 211. Slots 213 are each formed between adjacent two of the teeth 212. An insulating portion 202 is formed on an inner surface of each slot 213.

An aluminum wire coil 231 and a copper wire coil 232 are disposed in the slot 213. Unlike the coils 31 and 32 of the first embodiment, the aluminum wire coil 231 is disposed on one side of the slot 213 in the circumferential direction (on the right side in FIG. 8), while the copper wire coil 232 is disposed on the other side of the slot 213 in the circumferential direction (on the left side in FIG. 8).

Thus, in the stator 201 of the comparison example, most of the heat from the aluminum wire coil 231 is dissipated through the teeth 212. Since the heat dissipation efficiency of the teeth 212 is low as compared to that of the yoke 211 as described above, the effect of suppressing an increase in the temperature of the aluminum wire coil 231 is not high.

In contrast, in the first embodiment, as shown in FIGS. 6 and 7, the aluminum wire coil 31, which has a high electrical resistivity and whose temperature is raised easily, is disposed more densely in the first region 101 than in the second region 102. Thus, the heat generated in the aluminum wire coil 31 is efficiently dissipated to the outside through the yoke 11, and thus the high heat dissipation effect can be obtained.

(Diameter of Each Coil)

Next, a relationship between the diameters of the coils 31 and 32 will be described. Since the aluminum wire coil 31 and the copper wire coil 32 are connected in series with each other, the currents flowing through both coils 31 and 32 are equal. Therefore, a loss generated in the aluminum wire coil 31 having the higher electrical resistivity is higher than a loss generated in the copper wire coil 32. Thus, it is desirable to concentrate as many coil elements of the aluminum wire coil 31 as possible in the first region 101 where the heat dissipation efficiency is high.

As described above, the electrical resistivity of the aluminum wire coil 31 is expressed as $\rho_{A1}[\Omega \cdot m]$, and the diameter of the aluminum wire coil 31 is expressed as $D_{A1}$ [mm]. The electrical resistivity of the copper wire coil 32 is expressed as $\rho_{Cu}[\Omega \cdot m]$, and the diameter of the copper wire coil 32 is expressed as $D_{Cu}$ [mm]. An electrical resistance of a coil is a value (i.e., $\rho \times L/S$) obtained by multiplying an electrical resistivity $\rho$ by a length L of the coil and dividing the multiplied value by a cross-sectional area S of the coil. That is, when the length L of the coil is constant, the electrical resistance of the coil increases as the electrical resistivity of the coil increases, and the electrical resistance of the coil decreases as the cross-sectional area of the coil decreases.

A wire cross-sectional area of the aluminum wire coil 31 is expressed as $S_{A1}$, while a wire cross-sectional area of the copper wire coil 32 is expressed as $S_{Cu}$. In the case where the aluminum wire coil 31 and the copper wire coil 32 have the equal length L and the current flowing through the coils 31 and 32 is 1 [A], a loss [W] generated in the aluminum wire coil 31, i.e., the product of the square of the current and the electrical resistance is expressed as $\rho_{A1} \times (L/S_{A1})$, while a loss [W] generated in the copper wire coil 32 is expressed as $\rho_{Cu} \times (L/S_{Cu})$.

When the loss generated in the aluminum wire coil 31 is equal to the loss generated in the copper wire coil 32, $\rho_{A1} \times (L/S_{A1}) = \rho_{Cu} \times (L/S_{Cu})$ is satisfied. When this equation is solved for $S_{A1}$, $S_{A1} = (\rho_{A1}/\rho_{Cu}) \times S_{Cu}$ is obtained. That is, the cross-sectional area $S_{A1}$ of the aluminum wire coil 31 is $(\rho_{A1}/\rho_{Cu})$ times as large as the cross-sectional area $S_{Cu}$ of the copper wire coil 32.

The cross-sectional area of a coil is proportional to the square of the diameter of the coil. Thus, when the loss generated in the aluminum wire coil 31 is equal to the loss generated in the copper wire coil 32, the diameter $D_{A1}$ [mm] of the aluminum wire coil 31 is $\sqrt{(\rho_{A1}/\rho_{Cu})}$ times the diameter $D_{Cu}$ [mm] of the copper wire coil 32.

Thus, in order to make the loss generated in the aluminum wire coil 31 equal to or more than the loss generated in the copper wire coil 32, it is sufficient that the diameter $D_{A1}$ of the aluminum wire coil 31 is $\sqrt{(\rho_{A1}/\rho_{Cu})}$ times or less the diameter $D_{Cu}$ [mm] of the copper wire coil 32. In other words, it is sufficient that the diameter $D_{A1}$ of the aluminum wire coil 31 is less than or equal to $\sqrt{(\rho_{A1}/\rho_{Cu})} \times D_{Cu}$.

For this reason, it is most desirable that the electrical resistivity $\rho_{A1}$ [Ω·m] and the diameter $D_{A1}$ of the aluminum wire coil 31 and the electrical resistivity $\rho_{Cu}$ [Ω·m] and the diameter $D_{Cu}$ [mm] of the copper wire coil 32 satisfy the following equation (1).

$$D_{Cu} \leq D_{Al} < \sqrt{\frac{\rho_{Al}}{\rho_{Cu}}} \times D_{Cu}. \tag{1}$$

When the diameter $D_{A1}$ of the aluminum wire coil 31 is less than or equal to $\sqrt{(\rho_{A1}/\rho_{Cu})} \times D_{Cu}$, the electrical resistance of the aluminum wire coil 31 is greater than or equal to the electrical resistance of the copper wire coil 32, and therefore the loss generated in the aluminum wire coil 31 is greater than or equal to the loss generated in the copper wire coil 32. That is, a large loss (i.e., heat) is generated in the aluminum wire coil 31 concentrated in the first region 101, and its heat is dissipated through the yoke 11 of the stator core 10. Thus, especially high heat dissipation effect can be obtained.

For example, when the electrical resistivity $\rho_{A1}$ of the aluminum wire coil 31 is $2.82 \times 10^{-8}$ [Ω·m] and the electrical resistivity $\rho_{Cu}$ of the copper wire coil 32 is $1.68 \times 10^{-8}$ [Ω·m], the upper limit of the diameter $D_{A1}$ [mm] of the aluminum wire coil 31 is 1.296 times the diameter $D_{Cu}$ [mm] of the copper wire coil 32. When the diameter $D_{A1}$ of the aluminum wire coil 31 is smaller than $1.296 \times D_{Cu}$, especially high heat dissipation effect is obtained.

In the equation (1), the lower limit of the diameter $D_{A1}$ of the aluminum wire coil 31 is equal to the diameter $D_{Cu}$ of the copper wire coil 32. This is because, as mechanical strength of the aluminum wire coil 31 per unit cross-sectional area is lower than that of the copper wire coil 32, the diameter $D_{A1}$ of the aluminum wire coil 31 is desirably greater than or equal to the diameter $D_{Cu}$ of the copper wire coil 32 (i.e., $D_{Cu} \leq D_{A1}$) in order to obtain sufficient strength of the aluminum wire coil 31 in a winding process.

When the electrical resistivity $\rho_{A1}$ and the diameter $D_{A1}$ of the aluminum wire coil 31 and the electrical resistivity $\rho_{Cu}$ and the diameter $D_{Cu}$ of the copper wire coil 32 satisfy the equation (1), a large loss is generated in the aluminum wire coil 31 concentrated in the first region 101, and its heat can be efficiently dissipated through the yoke 11. Further, sufficient strength of the aluminum wire coil 31 in the winding process can be obtained.

Although the current flowing through the coils 31 and 32 is assumed to be 1 [A] when the equation (1) is derived, the current is not limited to 1 [A]. This is because of the following reason. If a current flowing through the coils 31 and 32 is expressed as I [A], and the loss generated in the aluminum wire coil 31 is equal to the loss generated in the copper wire coil 32, $\rho_{A1} \times (L/S_{A1}) \times I^2 = \rho_{Cu} \times (L/S_{Cu}) \times I^2$ is satisfied. From this equation, the above-described $S_{A1} = (\rho_{A1}/\rho_{Cu}) \times S_{Cu}$ is obtained, from which the equation (1) is derived.

The relationship between the electrical resistivity $\rho_{A1}$ and the diameter $D_{A1}$ of the aluminum wire coil 31 and the electrical resistivity $\rho_{Cu}$ and the diameter $D_{Cu}$ of the copper wire coil 32 is not limited to the above-described equation (1). The following equation (2) may be satisfied.

$$0.5 \times D_{Cu} \leq D_{Al} < \sqrt{\frac{\rho_{Al}}{\rho_{Cu}}} \times D_{Cu} \tag{2}$$

The upper limit of the diameter $D_{A1}$ of the aluminum wire coil 31 in equation (2) is the same as that in equation (1). The reason for this is as described above. In contrast, the lower limit of the diameter $D_{A1}$ of the aluminum wire coil 31 in equation (2) is $0.5 \times D_{Cu}$, i.e., ½ of the diameter $D_{Cu}$ of the coil 32.

In a process of winding the coil 3 composed of the aluminum wire coil 31 and the copper wire coil 32 connected in series around the tooth 12 of the stator core 10, it is desirable to use a common winding machine in order to avoid complicating the process. When the aluminum wire coil 31 and the copper wire coil 32 have different diameters, it is necessary to adjust a nozzle diameter of a winding nozzle of the winding machine to the diameter of the thicker coil.

If the diameter $D_{A1}$ of the aluminum wire coil 31 is less than ½ of the diameter $D_{Cu}$ of the copper wire coil 32, the aluminum wire coil 31 may be inserted in two rows into the winding nozzle and may be damaged thereby. The winding machine winds the aluminum wire coil 31 and the copper wire coil 32 by applying the same tension, and thus disconnection of the aluminum wire coil 31 may occur if the aluminum wire coil 31 is extremely thin.

For the reasons described above, in equation (2), the diameter $D_{A1}$ [mm] of the aluminum wire coil 31 is set to be greater than or equal to $0.5 \times D_{Cu}$ [mm]. Thus, a large loss is generated in the aluminum wire coil 31 concentrated in the first region 101, and its heat is effectively dissipated through the yoke 11, while the damage and disconnection of the aluminum wire coil 31 in the winding process can be prevented.

(Cross-Sectional Area Ratio of Coils)

The ratio of the wire cross-sectional area $S_{A1}$ of the aluminum wire coil 31 to the wire cross-sectional area $S_{Cu}$ of the copper wire coil 32, i.e., $S_{A1}/S_{Cu}$ is referred to as a cross-sectional area ratio k. Since the cross-sectional area $S_{A1}$ is $\pi \times (D_{A1}/2)^2$ and the cross-sectional area $S_{Cu}$ is $\pi \times (D_{Cu}/2)^2$, the cross-sectional area ratio k can be expressed as $k = (D_{A1}/D_{Cu})^2$. When the cross-sectional area ratio k is used, $D_{Cu} \leq D_{A1}$ of equation (1) is expressed as $1 \leq k$. Further, $0.5 \times D_{Cu} \leq D_{A1}$ of equation (2) is expressed as $k \leq 0.25$.

As described above, the aluminum wire coil 31 and the copper wire coil 32 are connected in series, and the loss generated in the aluminum wire coil 31 with the higher electrical resistivity is higher than the loss generated in the copper wire coil 32. In the first region 101 of the slot 13, the aluminum wire coil 31 in which a large loss is generated is disposed more densely, and thus the heat of the aluminum wire coil 31 is dissipated through the yoke 11.

A loss density will be described herein. The loss density [W/mm²] is a value obtained by dividing the loss generated in the coil by the wire cross-sectional area of the coil. Here, consideration will be given to a range of the loss density of the aluminum wire coil 31 with respect to the loss density of the copper wire coil 32 with which the heat dissipation effect is enhanced.

The wire cross-sectional area $S_{A1}$ [mm$^2$] of the aluminum wire coil 31 and the wire cross-sectional area $S_{Cu}$ [mm$^2$] of the copper wire coil 32 have the relationship of $S_{A1}=k\times S_{Cu}$ using the definition ($k=S_{A1}/S_{Cu}$) of the cross-sectional area ratio k. When the current flowing through the coil 3 is 1 [A], the loss [W] generated in the aluminum wire coil 31 is $R_{A1}$ while the loss [W] generated in the copper wire coil 32 is $R_{Cu}$.

Therefore, the loss density [W/m$^2$] of the aluminum wire coil 31 is $R_{A1}/S_{A1}$, and is expressed as $R_{A1}/(k\times S_{Cu})$ using the cross-sectional area ratio k. The loss density [W/m$^2$] of the copper wire coil 32 is $R_{Cu}/S_{Cu}$.

A loss density ratio is defined as a ratio of the loss density of the aluminum wire coil 31 to the loss density of the copper wire coil 32. The loss density ratio is $\{R_{A1}/(k\times S_{Cu})\}/\{R_{Cu}/S_{Cu}\}$, and thus is expressed as $R_{A1}/(k\times R_{Cu})$.

FIG. 9 is a table showing a cross-sectional area S [mm$^2$], a cross-sectional area ratio k, an electrical resistance [Ω/km], a current [A], a loss [W], a loss density [W/mm$^2$], and a loss density ratio of each of the aluminum wire coil 31 and the copper wire coil 32.

When the loss density ratio is 1 or more, that is, when the loss density of the aluminum wire coil 31 is greater than or equal to the loss density of the copper wire coil 32, a large loss can be generated in the aluminum wire coil 31 disposed in the first region 101, and the heat can be efficiently dissipated through the yoke 11. Thus, $1 \leq R_{A1}/(k\times R_{Cu})$ is desirable.

As the mechanical strength of the aluminum wire coil 31 per unit cross-sectional area is lower than that of the copper wire coil 32, it is desirable that the diameter $D_{A1}$ of the aluminum wire coil 31 is greater than or equal to the diameter $D_{Cu}$ of the copper wire coil 32, in order to obtain sufficient strength for the winding process using the common winding machine. Thus, $1 \leq k$ is desirable.

From the above, the cross-sectional area ratio k, the electrical resistance $R_{A1}$ [Ω] of the aluminum wire coil 31, and the electrical resistance $R_{Cu}$ [Ω] of the copper wire coil 32 satisfy the following equations (3) and (4). Thus, a large loss can be generated in the aluminum wire coil 31 concentrated in the first region 101 and its heat can be efficiently dissipated through the yoke 11, while the sufficient strength of the aluminum wire coil 31 in the winding process can be obtained.

$$1 \leq \frac{R_{Al}}{k \times R_{Cu}} \quad (3)$$

$$1 \leq k \quad (4)$$

Here, the upper limit of the loss density ratio $R_{A1}/(k\times R_{Cu})$ is $R_{A1}/R_{Cu}$ which is obtained by substituting 1 into k. For example, when the diameter $D_{Cu}$ of the copper wire coil 32 is 0.9 [mm], the electrical resistance $R_{Cu}$ of the copper wire coil 32 is 27.1 [Ω], the diameter $D_{A1}$ of the aluminum wire coil 31 is 0.9 [mm], and the electrical resistance $R_{A1}$ of the aluminum wire coil 31 is 73.72 [Ω], the upper limit of $R_{A1}/(k\times R_{Cu})$ is $R_{A1}/R_{Cu}=1.679$. Thus, a desirable range of the loss density ratio $R_{A1}/(k\times R_{Cu})$ is expressed as $1\leq R_{A1}/(k\times R_{Cu})\leq 1.679$.

Figure 10:
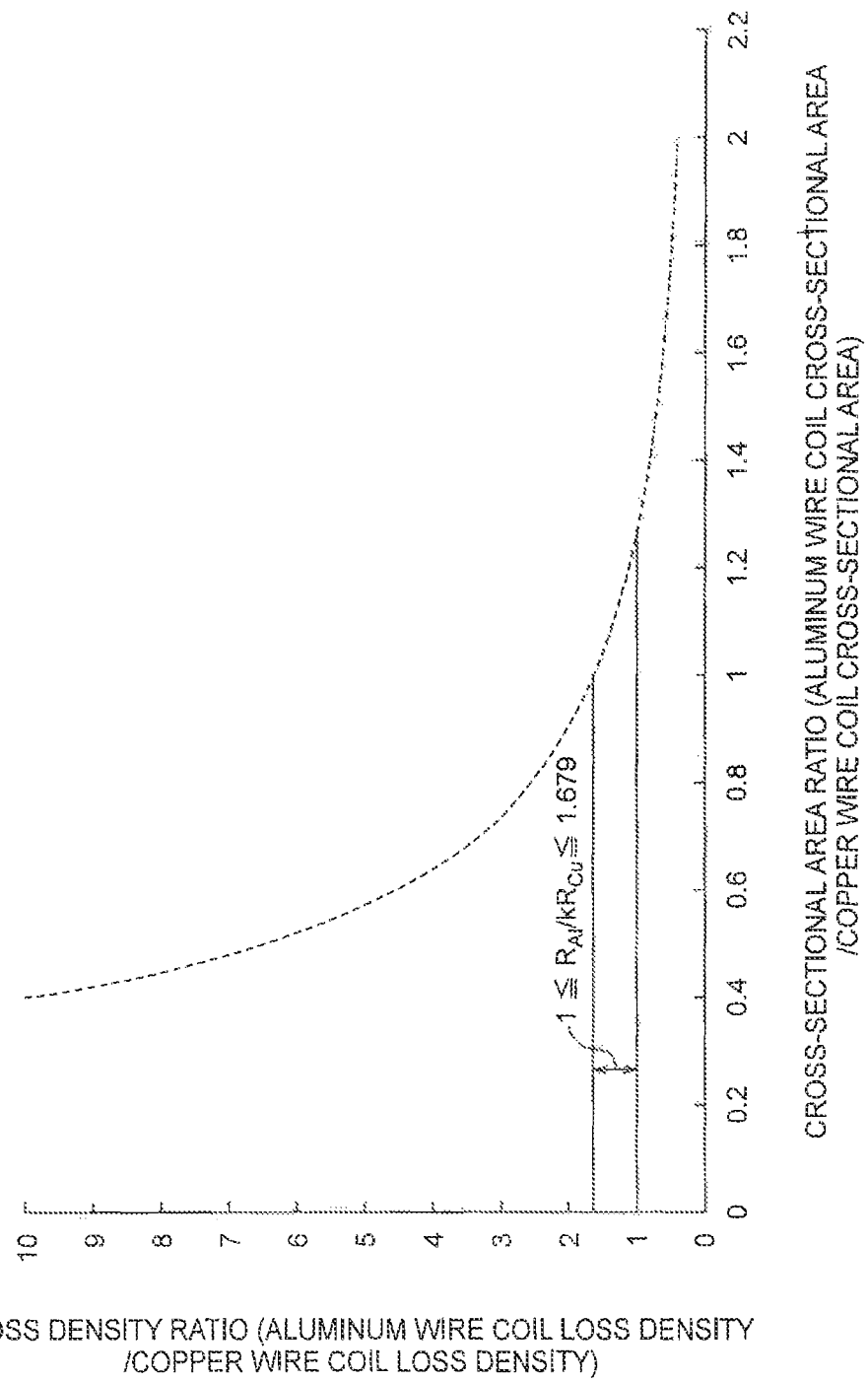
FIG. 10 is a graph showing a cross-sectional area ratio and a loss density ratio of the aluminum wire coil and the copper wire coil.

FIG. 10 is a graph showing the relationship between the cross-sectional area ratio k and the loss density ratio when the diameter $D_{Cu}$ of the copper wire coil 32 is set to 0.9 [mm] and the diameter $D_{A1}$ of the aluminum wire coil 31 is changed. As shown in FIG. 10, a desirable range of the loss density ratio when the diameter $D_{Cu}$ of the copper wire coil 32 is 0.9 [mm] is $1\leq R_{A1}/(k\times R_{Cu})\leq 1.679$.

In addition, the cross-sectional area ratio k, the electrical resistance $R_{A1}$ [Ω] of the aluminum wire coil 31, and the electrical resistance $R_{Cu}$ [Ω] of the copper wire coil 32 may satisfy the following equations (5) and (6). Equation (5) is the same as the equation (3) described above.

$$1 \leq \frac{R_{Al}}{k \times R_{Cu}} \quad (5)$$

$$0.25 \leq k \quad (6)$$

As described above, when the aluminum wire coil 31 and the copper wire coil 32 are wound using the common winding machine, the nozzle diameter of the winding nozzle of the winding machine needs to be adjusted to the diameter of the thicker coil. If the diameter $D_{A1}$ of the aluminum wire coil 31 is less than or equal to ½ of the diameter $D_{Cu}$ of the copper wire coil 32, the aluminum wire coil 31 may be inserted in two rows into the winding nozzle and may be damaged thereby. The winding machine winds the aluminum wire coil 31 and the copper wire coil 32 by applying the same tension, and thus disconnection of the aluminum wire coil 31 may occur if the aluminum wire coil 31 is extremely thin.

Thus, the lower limit of diameter $D_{A1}$ [mm] of the aluminum wire coil 31 is desirably $0.5\times D_{Cu}$ [mm]. This condition is expressed as $0.25\leq k$ using the cross-sectional area ratio k.

As described above, the cross-sectional area ratio k, the electrical resistance $R_{A1}$ [Ω] of the aluminum wire coil 31, and the electrical resistance $R_{Cu}$ [Ω] of the copper wire coil 32 satisfy equations (5) and (6). Thus, a large loss can be generated in the aluminum wire coil 31 concentrated in the first region 101 of the slot 13 and its heat can be efficiently dissipated through the yoke 11, while the damage and disconnection of the aluminum wire coil 31 in the winding process can be sufficiently prevented.

Here, the upper limit of loss density ratio $R_{A1}/(k\times R_{Cu})$ is $R_{A1}/(0.25\times R_{Cu})$ which is obtained by substituting 0.25 into k. For example, when the diameter $D_{Cu}$ of the copper wire coil 32 is 0.9 [mm], the electrical resistance $R_{Cu}$ of the copper wire coil 32 is 27.1 [Ω], the diameter $D_{A1}$ of the aluminum wire coil 31 is 0.45 [mm], and the electrical resistance $R_{A1}$ of the aluminum wire coil 31 is 174.9 [Ω], the upper limit of $R_{A1}/(k\times R_{Cu})$ is $R_{A1}/(0.25\times R_{Cu})=25.815$. In this case, a desirable range of the loss density ratio $R_{A1}/(k\times R_{Cu})$ is expressed as $1\leq R_{A1}(k\times R_{Cu})\leq 25.815$.

(Induction Motor)

The motor 100 of the first embodiment is an induction motor as described above. That is, a rotating magnetic field is generated by the current in the coil 3 of the stator 1, and generates an induced current in the squirrel-cage secondary conductor 6 of the rotor 5, so that torque is produced by the action of the induced current and the rotating magnetic field.

The induction motor is generally driven without using an inverter. That is, a controller of the motor 100 generally drives the motor 100 by supplying a constant voltage to the coil 3. Thus, the fluctuation in load applied to the motor 100 or voltage supplied to the motor 100 may cause significant increase in the current flowing through the coil 3, and may cause rise in temperature of the coil 3.

Since the motor 100 of the first embodiment has the high heat dissipation effect as described above and thus can suppress the increase in the temperature of the coil 3, especially high effect can be obtained when the motor 100 is applied to the induction motor where the current largely fluctuates. Although the motor 100 of the first embodiment is the induction motor, the high heat dissipation effect can be obtained even when the motor 100 is a synchronous motor.

(Effects of First Embodiment)

As described above, in the first embodiment of the present invention, the area S1 of the first region 101 of the slot 13, the total cross-sectional area A1 of the aluminum wire coil 31 (i.e., the first coil) in the first region 101, the area S2 of the second region 102, and the total cross-sectional area A2 of the aluminum wire coil 31 in the second region 102 satisfy (A1/S1)>(A2/S2). In this way, the aluminum wire coil 31 with the higher electrical resistivity are densely disposed in the first region 101 on the outer side of the slot 13 in the radial direction, and thus the heat of the aluminum wire coil 31 can be efficiently dissipated through the yoke 11 of the stator core 10, and thus an increase in the temperature can be suppressed. Furthermore, the heat dissipation effect of the motor 100 makes it possible to flow a large amount of current through the coil 3, and thus an output of the motor 100 can be increased.

The total cross-sectional area A1 of the aluminum wire coil 31 in the first region 101, the total cross-sectional area C1 of the copper wire coil 32 (i.e., the second coil) in the first region 101, and the area S1 of the first region 101 satisfy (A1/S1)>(C1/S1). In this way, the occupancy density of the aluminum wire coil 31 is higher than the occupancy density of the copper wire coil 32 in the first region 101, and thus the heat of the aluminum wire coil 31 can be efficiently dissipated through the yoke 11 of the stator core 10. Therefore, the heat dissipation effect can be further enhanced.

The total cross-sectional area A1 of the aluminum wire coil 31 in the first region 101, the total cross-sectional area C1 of the copper wire coil 32 in the first region 101, the total cross-sectional area A2 of the aluminum wire coil 31 in the second region 102, and the total cross-sectional area C2 of the copper wire coil 32 in the second region 102 satisfy (A1/C1)>(A2/C2). In this way, the ratio of the total cross-sectional area of the aluminum wire coil 31 to that of the copper wire coil 32 is higher in the first region 101 than in the second region 102, and thus the heat of the aluminum wire coil 31 can be efficiently dissipated through the yoke 11 of the stator core 10, so that the heat dissipation effect can be further enhanced.

The electrical resistivity $\rho_{A1}$ [Ω·m] and the diameter $D_{A1}$ [mm] of the aluminum wire coil 31 and the electrical resistivity $\rho_{Cu}$ [Ω·m] and the diameter $D_{Cu}$ [mm] of the copper wire coil 32 satisfy the above-described equation (1). Thus, a large loss (i.e., heat) is generated in the aluminum wire coil 31 concentrated in the first region 101, and its heat is dissipated through the yoke 11 of the stator core 10, so that the heat dissipation effect can be further enhanced. Moreover, by making the diameter $D_{A1}$ of the aluminum wire coil 31 greater than or equal to the diameter $D_{Cu}$ of the copper wire coil 32, sufficient strength of the aluminum wire coil 31 in the winding process can be obtained.

The electrical resistivity $\rho_{A1}$ [Ω·m] and the diameter $D_{A1}$ [mm] of the aluminum wire coil 31 and the electrical resistivity $\rho_{Cu}$ [Ω·m] and the diameter $D_{Cu}$ [mm] of the copper wire coil 32 satisfy the above-described equation (2), and thus the heat dissipation effect can be enhanced. Further, by making the diameter $D_{A1}$ of the aluminum wire coil 31 greater than or equal to ½ of the diameter $D_{Cu}$ of the copper wire coil 32, the damage and disconnection of the aluminum wire coil 31 in the winding process can be prevented.

In addition, the electrical resistance $R_{A1}$ of the aluminum wire coil 31, the electrical resistance $R_{Cu}$ of the copper wire coil 32, and the cross-sectional area ratio k, which is the ratio of the cross-sectional area of the aluminum wire coil 31 to the cross-sectional area of the copper wire coil 32, satisfy the above-described equation (3). Thus, the loss density of the aluminum wire coil 31 is greater than or equal to the loss density of the copper wire coil 32. Therefore, a large loss can be generated in the aluminum wire coil 31, and its heat can be efficiently dissipated through the yoke 11, so that the heat dissipation effect can be further enhanced.

When the cross-sectional area ratio k is greater than or equal to 1, sufficient strength of the aluminum wire coil 31 can be obtained in the winding process using the common winding machine. When the cross-sectional area ratio k is greater than or equal to 0.25, the damage or disconnection of the aluminum wire coil 31 can be prevented in the winding process using the common winding machine.

The motor 100 of the first embodiment exhibits especially high effect when the motor 100 is applied to the induction motor which is generally driven without using the inverter.

Although the aluminum wire coil 31 as the first coil and the copper wire coil 32 as the second coil are used in the first embodiment, the coils are not limited to a combination of the aluminum wire coil 31 and the copper wire coil 32. For example, two types of coils may be selected from coils made of gold, silver, copper, aluminum, and the like. In this case, one of the selected coils that has a higher electrical resistivity may be used as the first coil, while the other of the selected coils that has a lower electrical resistivity may be used as the second coil.

Modification

Figure 11:
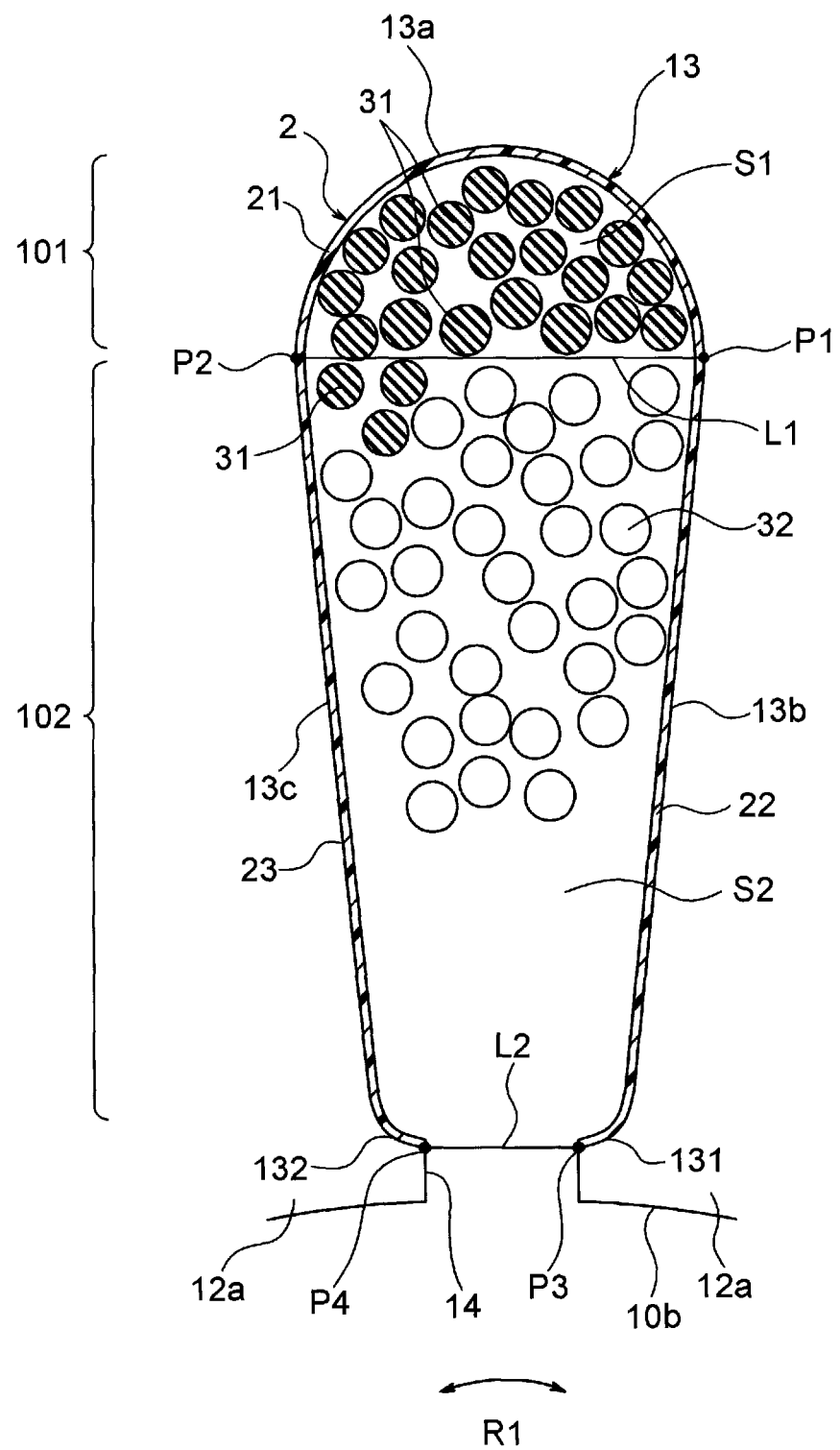
FIG. 11 is an enlarged cross-sectional view showing a part of a stator in a modification of the first embodiment.

FIG. 11 is an enlarged diagram showing a part including the slot 13 of a stator in a modification of the first embodiment. In the first embodiment described above, the aluminum wire coil 31 and the copper wire coil 32 are disposed in the first region 101 of the slot 13, and the occupancy density of the aluminum wire coil 31 is higher than the occupancy density of the copper wire coil 32 in the first region 101.

In contrast, in the modification, only the aluminum wire coil 31 is disposed in the first region 101 of the slot 13. In the second region 102, the aluminum wire coil 31 and the copper wire coil 32 are disposed. The other configuration of the modification is the same as described in the first embodiment.

In the modification, only the aluminum wire coil 31 is disposed in the first region 101 where the heat dissipation efficiency is high. Thus, the heat of the aluminum wire coil 31 can be more effectively transferred to the stator core 10 and dissipated therethrough.

(Scroll Compressor)

Figure 12:
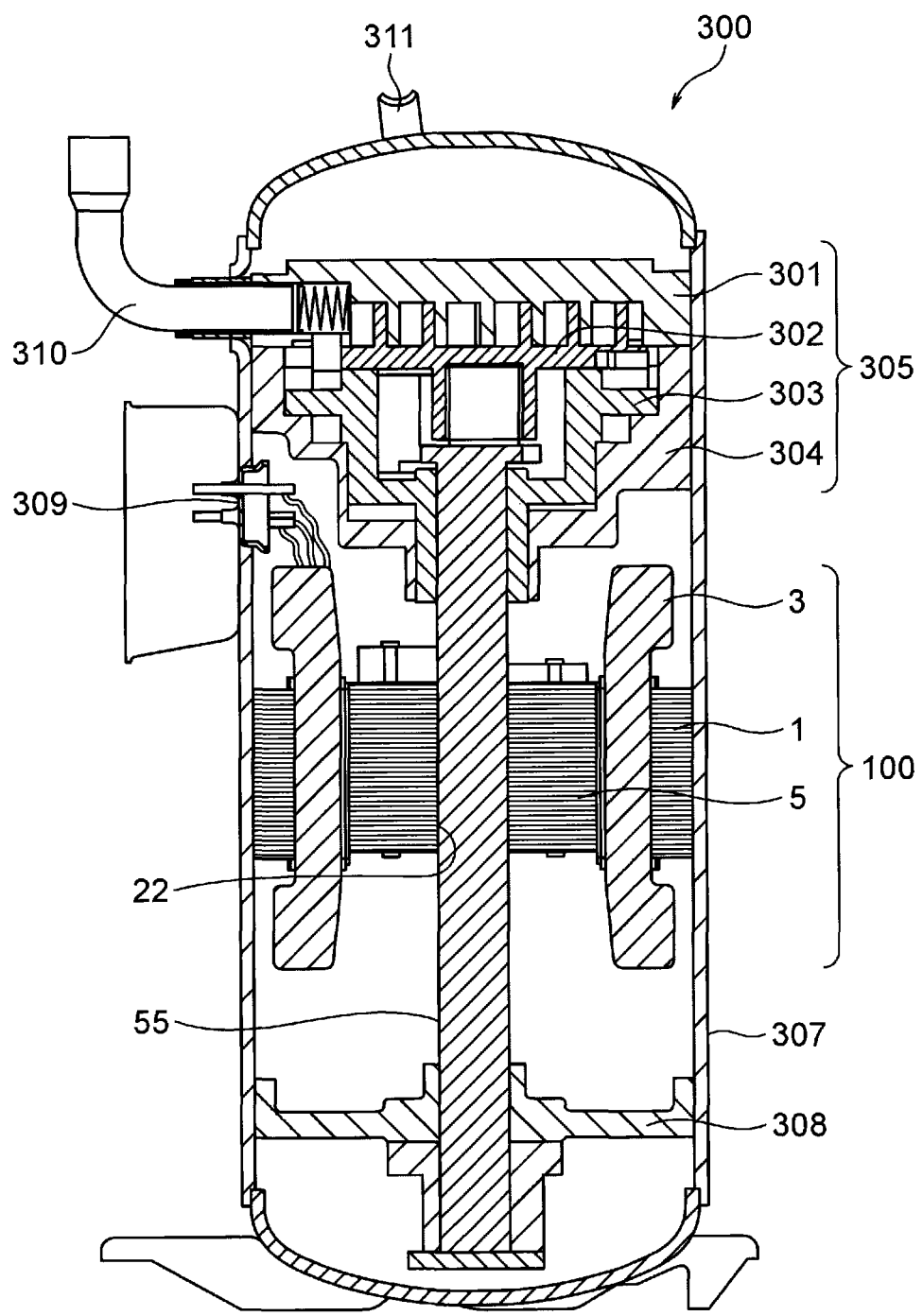
FIG. 12 is a diagram showing a compressor to which the motor of the first embodiment is applicable.

Next, a scroll compressor 300 as the compressor to which the motor 100 described in the first embodiment and the modification is applicable will be described. FIG. 12 is a sectional view showing the scroll compressor 300. The scroll compressor 300 includes a closed container 307, a compression mechanism 305 disposed in the closed container 307, the motor 100 for driving the compression mechanism 305, the shaft 55 connecting the compression mechanism 305 and the motor 100, and a sub-frame 308 supporting a lower end of the shaft 55 (i.e., an end of the shaft opposite to the compression mechanism 305).

The compression mechanism 305 includes a fixed scroll 301 having a spiral portion, an swing scroll 302 having a spiral portion that forms a compression chamber between itself and the spiral portion of the fixed scroll 301, a compliance frame 303 that holds an upper end of the shaft 55, and a guide frame 304 that is fixed to the closed container 307 and holds the compliance frame 303.

A suction pipe 310 penetrating the closed container 307 is press-fitted into the fixed scroll 301. The closed container 307 is provided with a discharge pipe 311 that allows high-pressure refrigerant gas discharged from the fixed scroll 301 to be discharged to the outside. The discharge pipe 311 is connected to a not shown opening provided between the motor 100 and the compression mechanism 305 in the closed container 307.

The motor 100 is fixed to the closed container 307 by fitting the stator 1 into the closed container 307. The configuration of the motor 100 is as described above. A glass terminal 309 for supplying electric power to the motor 100 is fixed to the closed container 307 by welding.

When the motor 100 rotates, the rotation of the motor 100 is transmitted to the swing scroll 302, and the swing scroll 302 swings. When the swing scroll 302 swings, a volume of the compression chamber formed between the spiral portion of the swing scroll 302 and the spiral portion of the fixed scroll 301 changes. Refrigerant gas is sucked therein through the suction pipe 310, compressed, and discharged through the discharged pipe 311.

During rotation of the motor 100, the current flows through the coil 3, and heat is generated. The heat generated in the coil 3 is transferred to the stator core 10 via the insulating portion (FIG. 1) and then dissipated from the stator core 10 to the closed container 307. The motor 100 of each of the first embodiment and the modification has the high heat dissipation effect and thus can suppress an increase in the temperature inside the scroll compressor 300. With the increase in output of the motor 100, the output of the scroll compressor 300 can also be increased.

Although the scroll compressor 300 is described as an example of the compressor, the motor described in each of the first embodiment and modification may also be applied to compressors other than the scroll compressor 300.

(Air Conditioner)

Figure 13:
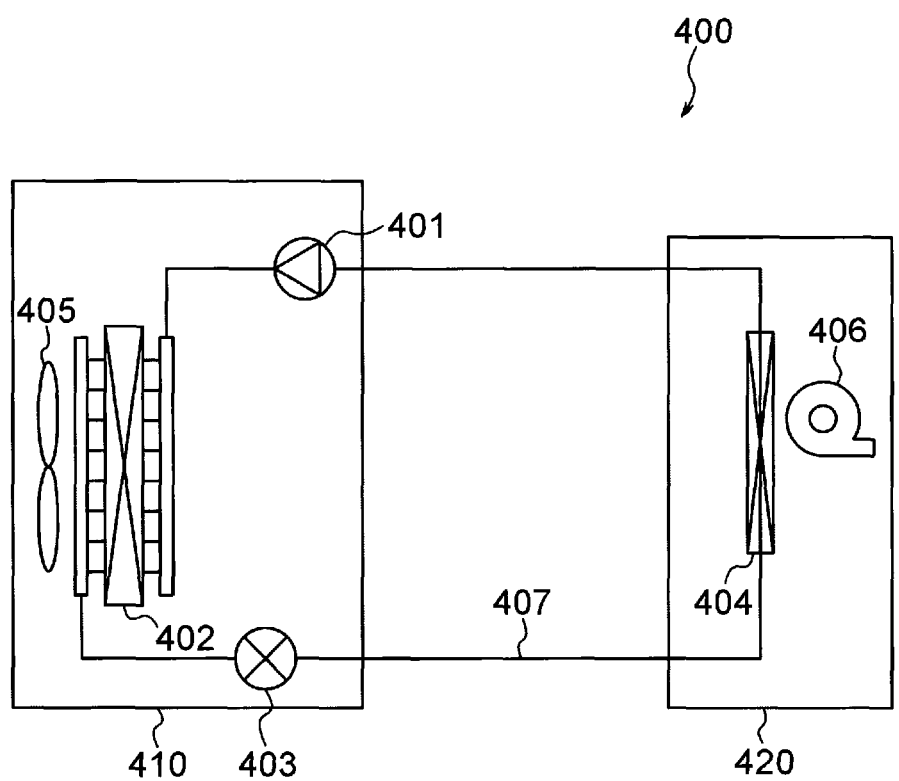
FIG. 13 is a diagram showing an air conditioner that includes the compressor shown in FIG. 12.

Next, an air conditioner to which the motor of each of the above-described first embodiment and modification is applicable will be described. FIG. 13 is a diagram showing an air conditioner 400 (a refrigeration cycle device). The air conditioner 400 includes a compressor 401, a condenser 402, a throttle device (a decompression device) 403, and an evaporator 404. The compressor 401, the condenser 402, the throttle device 403, and the evaporator 404 are connected together by a refrigerant pipe 407 to constitute a refrigeration cycle. That is, the refrigerant circulates through the compressor 401, the condenser 402, the throttle device 403, and the evaporator 404 in this order.

The compressor 401, the condenser 402, and the throttle device 403 are provided in an outdoor unit 410. The compressor 401 is constituted by the scroll compressor 300 shown in FIG. 12. The outdoor unit 410 is provided with an outdoor fan 405 that supplies outdoor air to the condenser 402. The evaporator 404 is provided in an indoor unit 420. The indoor unit 420 is provided with an indoor fan 406 that supplies indoor air to the evaporator 404.

An operation of the air conditioner 400 is as follows. The compressor 401 compresses sucked refrigerant, and sends out the compressed refrigerant. The condenser 402 exchanges heat between the refrigerant flowing from the compressor 401 and outdoor air to condense and liquefy the refrigerant and sends out the liquefied refrigerant to the refrigerant pipe 407. The outdoor fan 405 supplies outdoor air to the condenser 402. The throttle device 403 adjusts the pressure or the like of the refrigerant flowing through the refrigerant pipe 407 by changing its opening degree.

The evaporator 404 exchanges heat between the refrigerant brought into a low-pressure state by the throttle device 403 and the indoor air to cause the refrigerant to take heat from the indoor air and evaporate (vaporize), and then sends out the evaporated refrigerant to the refrigerant pipe 407. The indoor fan 406 supplies indoor air to the evaporator 404. Thus, cooled air deprived of heat at the evaporator 404 is supplied into the room.

As described above, the motor 100 of each of the first embodiment and the modification has the high heat dissipation effect and thus can suppress an increase in the temperature inside the compressor 401. Thus, a stable operation of the air conditioner 400 is enabled. With the increase in output of the compressor 401 due to the increase in output of the motor 100, the output of the air conditioner 400 can also be increased.

Although the desirable embodiment of the present invention has been described, the present invention is not limited to the above-described embodiment, and various modifications and changes can be made without departing from the scope of the present invention.

What is claimed is:

1. A stator comprising:
    a stator core having an inner circumference extending in a circumferential direction about an axis, a slot formed on an outer side of the inner circumference in a radial direction about the axis, and a yoke formed on an outer side of the slot in the radial direction, and
    a first coil and a second coil disposed in the slot and connected in series with each other, the first coil having a conductor formed of aluminum, the second coil having a conductor formed of copper, which has a lower electrical resistivity than that of aluminum,
    wherein the slot comprises:
        a slot opening opened to the inner circumference of the stator core;
        a slot bottom portion having a curved shape and disposed on an outer side of the slot opening in the radial direction, the slot bottom portion connecting to the yoke; and
        a first side portion and a second side portion disposed between the slot opening and the slot bottom portion and facing each other in the circumferential direction,
    wherein a diameter of the first coil is greater than or equal to a diameter of the second coil,
    wherein in a plane perpendicular to the axis, a first straight line is defined as a straight line connecting a border between the slot bottom portion and the first side portion and a border between the slot bottom portion and the second side portion,
    wherein a first region is defined as a region surrounded by the first straight line and the slot bottom portion,
    wherein a second region is defined as a region in the slot on an outer side of the slot opening in the radial direction and on an inner side of the first straight line in the radial direction, and
    wherein an area S1 of the first region, a total cross-sectional area A1 of the first coil in the first region, an area S2 of the second region, and a total cross-sectional area A2 of the first coil in the second region satisfy the following equation:

(A1/S1)>(A2/S2).

2. The stator according to claim 1, wherein the total cross-sectional area A1 of the first coil in the first region, a total cross-sectional area C1 of the second coil in the first region, and the area S1 of the first region satisfy the following equation:

(A1/S1)>(C1/S1).

3. The stator according to claim 1, wherein the total cross-sectional area A1 of the first coil in the first region, a total cross-sectional area C1 of the second coil in the first region, the total cross-sectional area A2 of the first coil in the second region, and a total cross-sectional area C2 of the second coil in the second region satisfy the following equation:

(A1/C1)>(A2/C2).

4. The stator according to claim 1, wherein, of the first coil and the second coil, only the first coil is disposed in the first region.

5. The stator according to claim 1, wherein a diameter $D_{Al}$ of the first coil, an electrical resistivity $\rho_{Al}$ of the first coil, a diameter $D_{Cu}$ of the second coil, and an electrical resistivity $\rho_{Cu}$ of the second coil satisfy the following equation:

$$D_{Cu} \leq D_{Al} < \sqrt{\frac{\rho_{Al}}{\rho_{Cu}}} \times D_{Cu}.$$

6. The stator according to claim 1, wherein a diameter $D_{Al}$ of the first coil, an electrical resistivity $\rho_{Al}$ of the first coil, a diameter $D_{Cu}$ of the second coil, and an electrical resistivity $\rho_{Cu}$, of the second coil satisfy the following equation:

$$0.5 \times D_{Cu} \leq D_{Al} < \sqrt{\frac{\rho_{Al}}{\rho_{Cu}}} \times D_{Cu}.$$

7. The stator according to claim 1, wherein an electrical resistance $R_{Al}$ of the first coil, an electrical resistance $R_{Cu}$ of the second coil, and a ratio k of a cross-sectional area of the first coil to a cross-sectional area of the second coil satisfy the following equation:

$$1 \leq \frac{R_{Al}}{k \times R_{Cu}}.$$

8. The stator according to claim 7, wherein the ratio k is greater than or equal to 1.

9. The stator according to claim 7, wherein the ratio k is greater than or equal to 0.25.

10. A motor comprising:
the stator according to claim 1, and
a rotor rotatably provided on an inner side of the stator in the radial direction.

11. The motor according to claim 10, wherein the motor is an induction motor.

12. A compressor comprising:
a closed container;
a compression mechanism disposed in the closed container; and
the motor according to claim 10, the motor driving the compression mechanism.

13. An air conditioner comprising the compressor according to claim 12, a condenser, a decompression device, and an evaporator.

14. The stator according to claim 1,
wherein the yoke has an outer circumference in contact with a closed container in which the stator is housed, and
wherein heat is dissipated from the outer circumference of the yoke to the closed container.

15. A stator comprising:
a stator core having an inner circumference extending in a circumferential direction about an axis, a slot formed on an outer side of the inner circumference in a radial direction about the axis, and a yoke formed on an outer side of the slot in the radial direction, and
a first coil and a second coil disposed in the slot and connected in series with each other, the first coil having a conductor formed of aluminum, the second coil having a conductor formed of cover, which has a lower electrical resistivity than that of aluminum,
wherein the slot comprises:
a slot opening opened to the inner circumference of the stator core;
a slot bottom portion having a curved shape and disposed on an outer side of the slot opening in the radial direction, the slot bottom portion connecting to the yoke; and
a first side portion and a second side portion disposed between the slot opening and the slot bottom portion and facing each other in the circumferential direction,
wherein a diameter of the first coil is greater than or equal to a diameter of the second coil,
wherein in a plane perpendicular to the axis, a first straight line is defined as a straight line connecting a border between the slot bottom portion and the first side portion and a border between the slot bottom portion and the second side portion,
wherein a first region is defined as a region surrounded by the first straight line and the slot bottom portion, adjacent to the yoke,
wherein a second region is defined as a region in the slot on an outer side of the slot opening in the radial direction and on an inner side of the first straight line in the radial direction, adjacent to the first and second side portions,
wherein the stator core is configured such that heat dissipation efficiency is higher in the first region adjacent to the yoke than in the second region adjacent to the first and second side portions, and
wherein an area S1 of the first region, a total cross-sectional area A1 of the first coil in the first region, an area S2 of the second region, and a total cross-sectional area A2 of the first coil in the second region satisfy the following equation:

(A1/S1)>(A2/S2).

* * * * *